US010119628B1

(12) United States Patent
Becker

(10) Patent No.: US 10,119,628 B1
(45) Date of Patent: Nov. 6, 2018

(54) PRESSURE COMPENSATED SWITCHING SOLENOID VALVE

(71) Applicant: Schaeffler Technologies AG & Co. KG, Herzogenaurach (DE)

(72) Inventor: David Becker, White Lake, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 36 days.

(21) Appl. No.: 15/491,250

(22) Filed: Apr. 19, 2017

(51) Int. Cl.
| | | |
|---|---|---|
| *F16K 11/048* | (2006.01) |
| *F16K 1/44* | (2006.01) |
| *F16K 31/06* | (2006.01) |
| *F16K 39/02* | (2006.01) |
| *H01F 7/129* | (2006.01) |
| *F01L 1/344* | (2006.01) |
| *H01F 7/16* | (2006.01) |

(52) U.S. Cl.
CPC .......... *F16K 39/022* (2013.01); *F01L 1/3442* (2013.01); *F16K 1/443* (2013.01); *F16K 11/048* (2013.01); *F16K 31/0655* (2013.01); *H01F 7/129* (2013.01); *H01F 7/1607* (2013.01); *F01L 2001/3443* (2013.01)

(58) Field of Classification Search
CPC .... F16K 1/443; F16K 11/048; F16K 31/0655; F16K 39/022; H01F 7/129
USPC ..................................................... 251/129.07
See application file for complete search history.

(56) References Cited

U.S. PATENT DOCUMENTS

| | | | | |
|---|---|---|---|---|
| 4,211,254 | A | | 7/1980 | Dyal |
| 5,050,642 | A | | 9/1991 | Bright |
| 5,443,241 | A | * | 8/1995 | Odaira ............... B60H 1/00485 137/625.5 |
| 5,476,245 | A | | 12/1995 | Augustin |
| 5,649,687 | A | * | 7/1997 | Rosas ................ F02M 25/0836 251/129.05 |
| 6,178,956 | B1 | * | 1/2001 | Steinmann ....... F02M 35/10222 123/568.21 |
| 6,283,152 | B1 | * | 9/2001 | Corte, Jr. ................. F16K 1/443 137/614.11 |
| 6,305,664 | B1 | * | 10/2001 | Holmes ................... F16K 31/06 251/129.18 |
| 6,971,627 | B2 | * | 12/2005 | Hirata ................. F16K 11/0708 251/129.07 |
| 7,401,762 | B2 | * | 7/2008 | Ohmori ..................... F16K 1/36 137/340 |
| 8,333,362 | B2 | | 12/2012 | Busato et al. |

(Continued)

*Primary Examiner* — Seth W MacKay-Smith
(74) *Attorney, Agent, or Firm* — Volpe and Koenig, P.C.

(57) ABSTRACT

A pressure compensated switching solenoid valve is provided having a solenoid connected to a hydraulic housing that has a first chamber defined between first and second valve seats and a second chamber. A sealing tube is connected to the hydraulic housing, and an armature is slidably located therein. A sealing element engages an end of the armature, and is movable via the solenoid and the spring between a first position, in which a poppet contacts the second valve seat to provide one communication path, and a second position in which the intermediate sealing surface contacts and seals against the first valve seat to provide a second communication path. At least one pressure compensation fluid pathway in the hydraulic housing extends from the supply port to a generally annular upper surface of the armature to compensate for pressure fluctuations from a pressure supply that act on the poppet.

14 Claims, 4 Drawing Sheets

(56) References Cited

U.S. PATENT DOCUMENTS

| | | | | |
|---|---|---|---|---|
| 8,348,231 B2* | 1/2013 | Czimmek | .............. | F02M 23/00 251/129.07 |
| 2010/0187457 A1* | 7/2010 | Kratzer | .................. | B60T 8/363 251/129.15 |

* cited by examiner

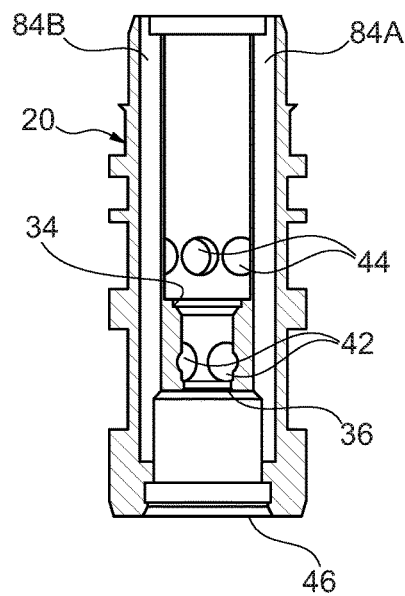
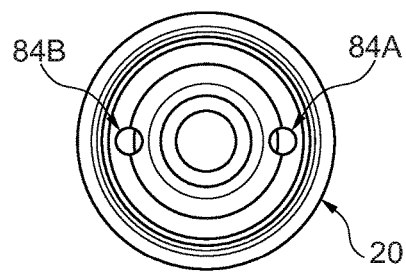
Fig. 3A
Fig. 3B
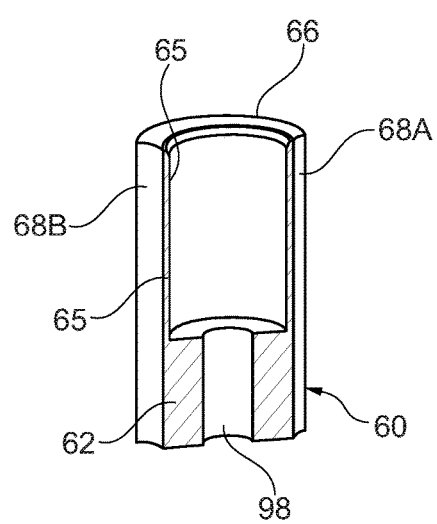
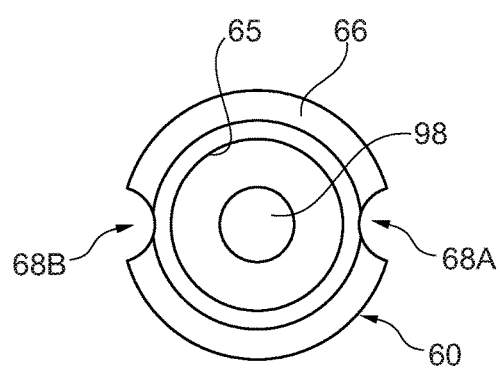
Fig. 4A
Fig. 4B

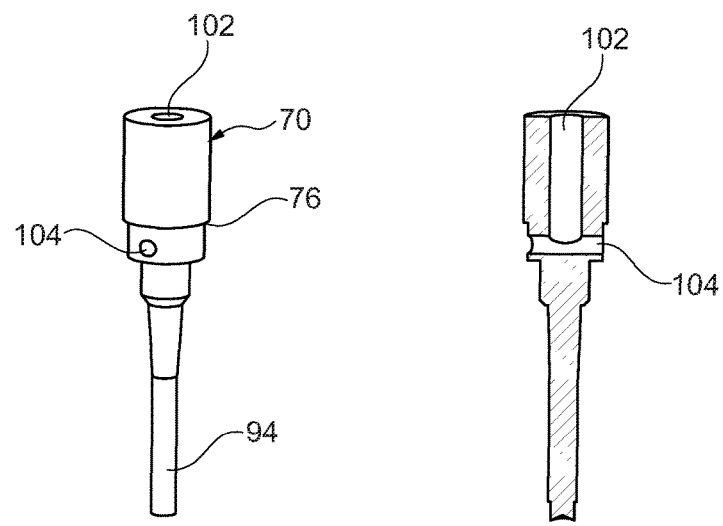
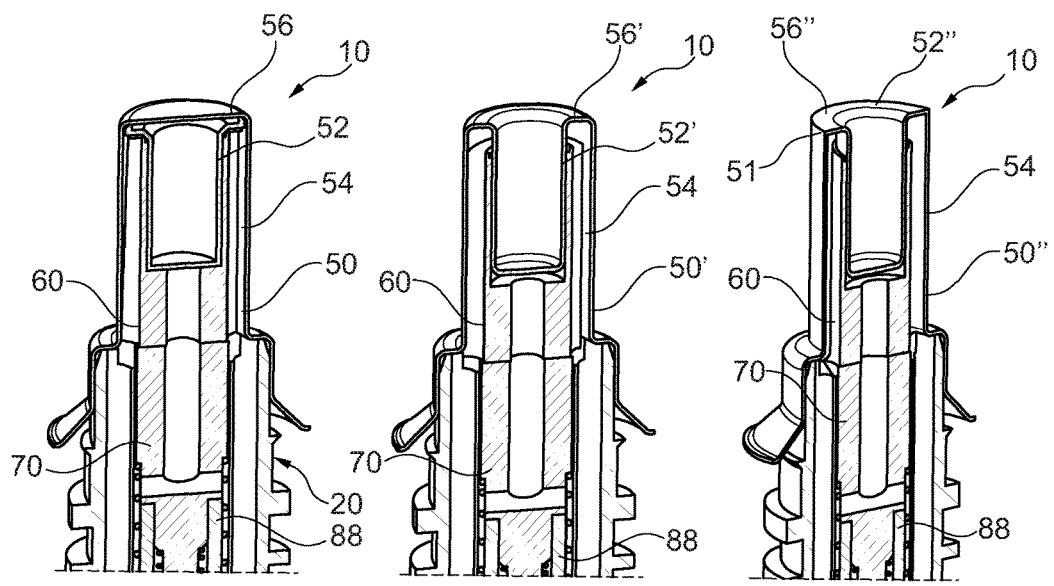

PRESSURE COMPENSATED SWITCHING SOLENOID VALVE

FIELD OF INVENTION

The invention relates to solenoid valves, and in particular to switching valves used in connection with valve train systems of internal combustion engines.

BACKGROUND

Control valves are known that use a solenoid actuator to switch open or closed the interface between a spool valve and a valve body. U.S. Pat. No. 8,333,362 discloses one such valve. In order to account for pressure acting on the valve body, this reference attaches a separate pressure balancing component to the armature and valve insert that can be acted on by opposing forces of the pressure medium so that the forces cancel each other out and reduce the force needed to open the actuator.

One type of control valve is an electrohydraulic switching solenoid valves that is used to control engine valve train systems as well as in other applications. The response time of the solenoid is an important part of the overall valve train system timing and performance. It is desirable to minimize system response time and variation in that time so that engine performance and/or fuel consumption are optimized at various operating conditions.

In most conventional solenoid valve designs, the internal force balance is affected by hydraulic force due to the supply pressure acting on one or more of the exposed cross-sectional areas. Normal variation in the supply pressure creates unwanted variation in the solenoid on and off response times.

It would be desirable to reduce response time variation due to changes in supply pressure and improve the accuracy of on and off response times. It would also be desirable to maintain the same overall size of the valve assembly for drop-in replacement of existing valves. Further, it would be desirable to achieve this at the same or reduced cost without complicating the assembly process for the known valves.

SUMMARY

Briefly stated, a pressure compensated switching solenoid valve is provided having a solenoid with a coil located in a solenoid housing. A yoke having a longitudinal opening extending in a stroke direction is located within the coil. A hydraulic housing having first and second axial ends is provided, with the hydraulic housing being connected at the first axial end thereof to the solenoid housing. A longitudinally extending housing opening extends between the first and second axial ends that is generally aligned with the longitudinal opening of the yoke. A first chamber, which can be a gallery chamber in one application, is defined between first and second valve seats longitudinally spaced apart within the hydraulic housing, and a second chamber, which can be a tank chamber in one application, is located on an opposite side of the first valve seat from the first chamber. At least one at least partially radially extending first chamber communication opening is located between the first chamber and an outer surface of the hydraulic housing, and at least one at least partially radially extending second chamber communication opening is located between the second chamber and an outer surface of the hydraulic housing. A supply port that is adapted to receive pressurized medium is located at the second axial end. A sealing tube is connected to the first axial end of the hydraulic housing, and a hollow longitudinally extending cup extends inwardly in a longitudinal direction within the sealing tube, defining an annular armature guide receiving area with a closed end. An armature having a body and a sleeve-shaped guide portion extending therefrom is provided, with the sleeve-shaped guide portion being slidably located in the annular armature guide receiving area. The sleeve-shaped guide portion has a generally annular upper surface with a first surface area, and at least one longitudinally extending groove extending along an outer surface of the body and the sleeve-shaped guide portion. A sealing element having a first end and a second end is located in the hydraulic housing, with the first end engaging an end of the armature. The sealing element includes an upper shoulder extending about the sealing element, an intermediate sealing surface, and a poppet located at the second end. A spring is supported in the hydraulic housing and contacts the upper shoulder in order to bias the sealing element in a longitudinal direction such that the poppet contacts the second valve seat. The sealing element is movable via the solenoid and the spring between a first position, in which the poppet contacts the second valve seat such that a fluid communication path through the first valve seat between the second chamber and the first chamber is available, and a second position, in which the intermediate sealing surface contacts and seals against the first valve seat and the poppet is moved from the second valve seat so that a fluid pathway from the supply port through the second valve seat to the second chamber is open and pressurized hydraulic medium is adapted to be delivered from the first chamber to, for example, a switching gallery of a valve train system. In order to compensate for pressure fluctuations of the pressure supply, the hydraulic housing further comprises at least one pressure compensation fluid pathway that extends from the supply port to the at least one longitudinally extending groove extending along the outer surface of the armature body and the sleeve-shaped guide portion of the armature that is adapted to provide a path for pressurized hydraulic fluid to flow to the generally annular upper surface of the armature.

In one preferred arrangement, the pressure compensated switching solenoid valve includes a seal between the armature and the sealing element.

In another aspect, upon the solenoid switching from an activated state to a deactivated state of the solenoid, a force of hydraulic fluid from the pressure supply acts on the intermediate sealing surface and the spring acts on the sealing element to return the poppet to a closed position against the second valve seat.

In one preferred arrangement, the intermediate sealing surface is on an intermediate sealing body located on the sealing element that is slideable in the longitudinal direction of the sealing element and is biased by a sealing body spring in a direction of the first valve seat. With this arrangement, in the first position of the sealing element, the sealing body spring reseats the intermediate sealing body such that the intermediate sealing surface contacts the first valve seat when a pressure in the first chamber drops below a predetermined value.

In another aspect, the pressure compensated switching solenoid valve has a leakage path between the hollow longitudinally extending cup and an inner surface of the sleeve-shaped guide portion of the armature. Preferably, a longitudinally extending drain hole extends through the armature body and leads to a longitudinally extending hole in the sealing element that connects to at least one cross hole in the sealing element that is in communication with the second chamber. This allows a return path for the pressurized hydraulic fluid that acts on the generally annular upper surface of the armature.

In another aspect of the pressure compensated switching solenoid valve, an end of the armature that contacts the sealing element extends radially beyond an outer periphery of the sealing element forming a pressure contact surface that has a smaller surface area than the generally annular upper surface of the armature.

In one preferred aspect, the armature is guided via the sleeve-shaped guide portion sliding on the hollow longitudinally extending cup. For ease of manufacturing and reduced costs, the hollow longitudinally extending cup can be formed as a separate part and press-fit in the sealing tube. Alternatively, it can be integrally formed with the sealing tube as a reverse deep-drawn part, or formed as a separate part and welded to the sealing tube.

In a preferred application for control of switchable valves in a valve train of an internal combustion engine, the first chamber is a gallery chamber and the second chamber is a tank chamber.

A method of reducing an effect of a variable supply pressure on a solenoid valve is also provided in connection with one or more features of the pressure compensated switching solenoid valve described above in order to improve the accuracy of on and off response times. The method includes activating the solenoid to move the armature, which moves in response to the magnetic field, with the armature applying force to the sealing element with the sealing body/sealing body spring and poppet, against a force of the spring and a hydraulic pressure force acting on the poppet, from the first position to the second position in which the intermediate sealing surface contacts the first valve seat and a fluid pathway from the supply port through the second valve seat to the first chamber is open. The hydraulic pressure acting on the sealing element and the poppet is compensated for by delivering pressurized hydraulic fluid from the supply port through the at least one pressure compensation fluid pathway that extends from the supply port to the at least one longitudinally extending groove extending along the outer surface of the armature body and the sleeve-shaped guide portion of the armature to the generally annular upper surface. Upon deactivating the solenoid, the force of the spring and of hydraulic fluid acting on the intermediate sealing surface moves the sealing element to the first position where the poppet contacts the second valve seat.

Preferably, the method further includes maintaining a flow of the pressurized hydraulic fluid from the supply port through the at least one pressure compensation fluid pathway that extends from the supply port to the at least one longitudinally extending groove extending along the outer surface of the armature body and the sleeve-shaped guide portion of the armature to the generally annular upper surface when the sealing element is in the first state.

The features as noted above and in the description below can be used separately or in combination in connection with various different types of electrohydraulic switching solenoid valves. Other aspects of the invention are described below and in the claims, and have not been repeated here.

BRIEF DESCRIPTION OF THE DRAWINGS

The foregoing Summary and the following detailed description will be better understood when read in conjunction with the appended drawings, which illustrate a preferred embodiment of the invention. In the drawings:

FIG. 3A is a cross-sectional view of the hydraulic housing shown separately.

FIG. 3B is a top view of the hydraulic housing shown in FIG. 3A.

FIG. 4A is a perspective, cross-sectional view of the armature.

FIG. 4B is a top view of the armature shown in FIG. 4A.

FIG. 5A is a perspective view of the sealing element.

FIG. 5B is a perspective, cross-sectional view through the sealing element.

FIG. 6A is an enlarged perspective cross-sectional view of a portion of the armature, the hydraulic housing and the sealing element with a first embodiment of a sealing tube with a hollow longitudinally extending cup.

FIG. 6B is a partial perspective cross-sectional view of the armature, the hydraulic housing and the sealing element showing a second embodiment of the sealing tube and hollow longitudinally extending cup.

FIG. 6C is a partial perspective cross-sectional view of the hydraulic housing, armature and sealing tube showing a third embodiment of the hollow longitudinally extending cup.

DETAILED DESCRIPTION OF THE PREFERRED EMBODIMENTS

Figure 1:
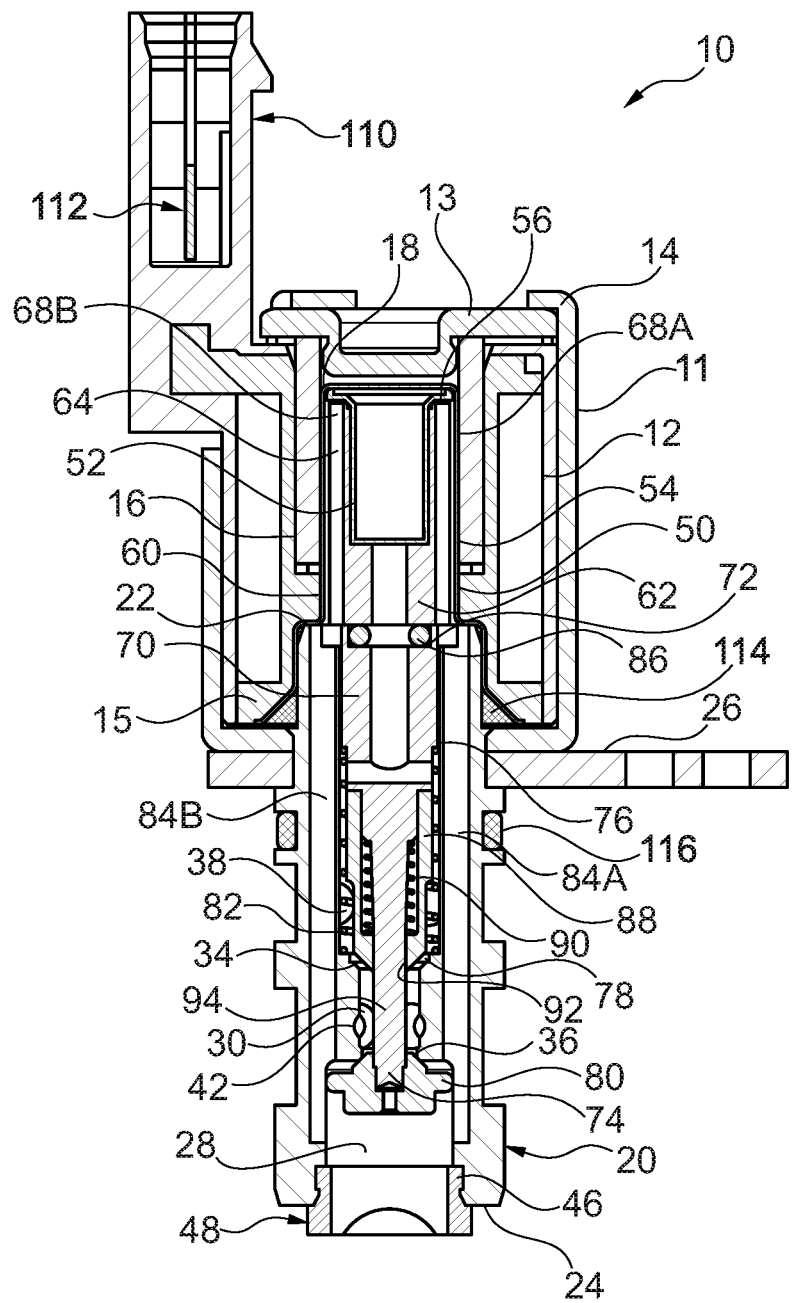
FIG. 1 is a cross-sectional view through a pressure compensated switching solenoid valve.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 2A:
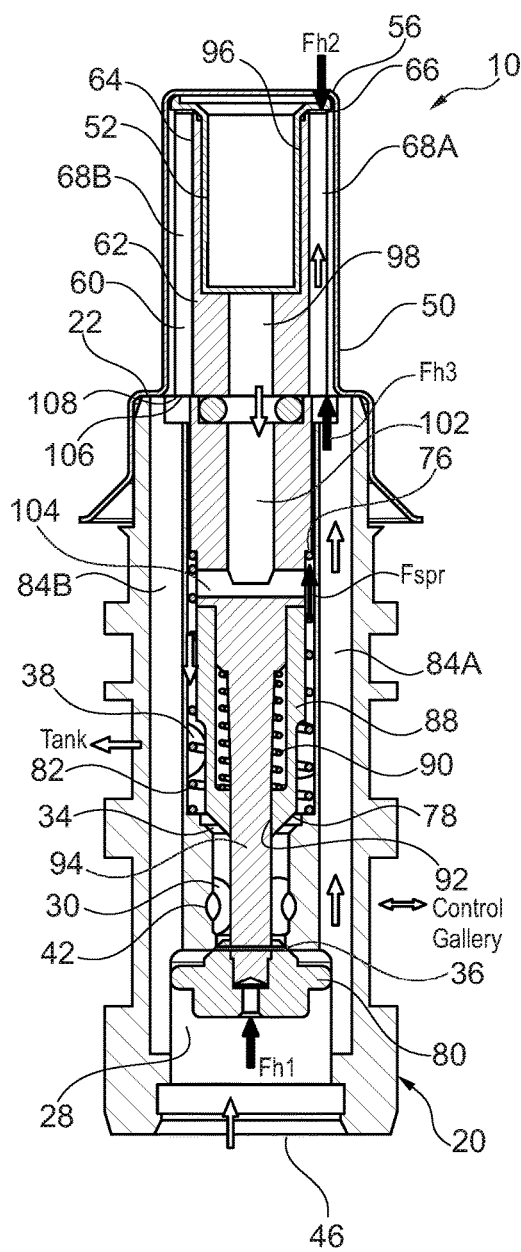
FIG. 2A is an enlarged cross-sectional view showing the armature and hydraulic housing and the sealing element in a first position.
Figure 2B:
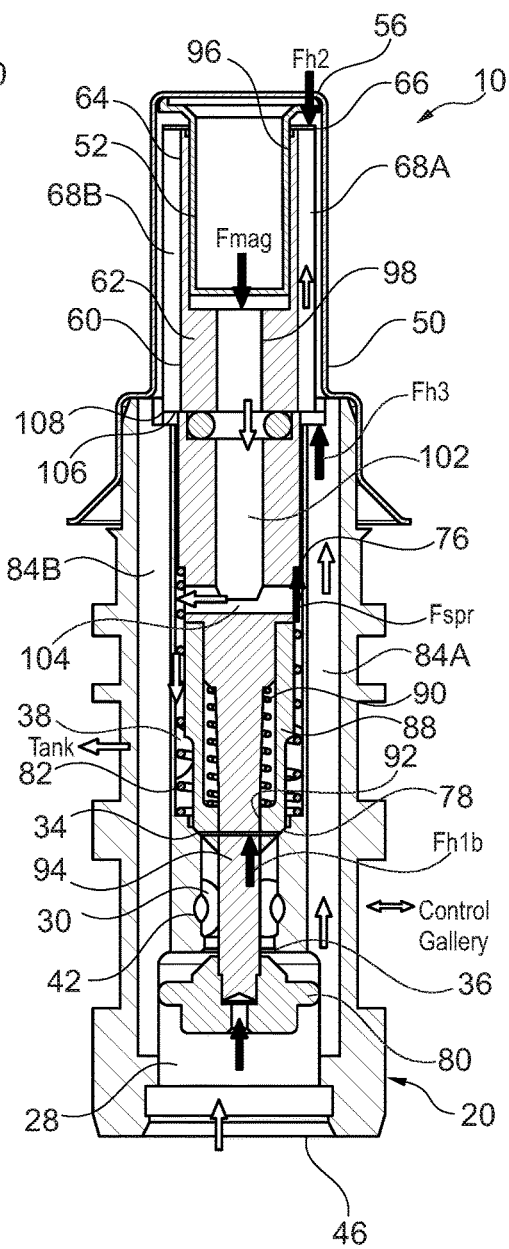
FIG. 2B is a cross-sectional view similar to FIG. 2A showing the Armature/O-Ring/sealing element in a second position.

Referring to FIGS. 1, 2A, and 2B, a pressure compensated switching solenoid valve 10 is shown (also referred to herein as the "solenoid valve 10"). The solenoid valve 10 includes a solenoid 11 with a coil 14, preferably wound about a bobbin 15, located in a solenoid housing 12. A cap 13 is preferably provided which closes off one end of the solenoid housing 12. A yoke 16 having a longitudinal opening extending in a stroke direction is located within the coil 12. As shown in FIG. 1, preferably, a plastic overmold 110 surrounds the coil 14, the bobbin 15, and the yoke 16, and provides power via terminals 112 to the coil 14 for activating and deactivating the solenoid 11.

A hydraulic housing 20 having first and second axial ends 22, 24 is provided. The hydraulic housing 20 is connected at the first axial end 22 thereof to the solenoid housing 12. Preferably a mounting tab 26 is located between the hydraulic housing 20 and the solenoid housing 14. In the illustrated embodiment, the hydraulic housing is swaged into position against an inner surface of the solenoid housing 14 with the mounting tab 26 being trapped between a protrusion on an outer surface of the hydraulic housing 20 and the solenoid housing 14. O-ring seals 114, 116 can be provided on an external surface of the hydraulic housing 20 as well as at the interface of the hydraulic housing 20 and the solenoid housing 14. The hydraulic housing 20 has external circumferential grooves which, in a preferred embodiment of the pressure compensated switching solenoid valve 10, are adapted to be aligned with corresponding connections to a control gallery and a tank connection when the hydraulic housing is inserted into a control opening in an engine head or valve block. A longitudinally extending housing opening 28 extends between the first and second axial ends 22, 24 and is generally aligned with a longitudinal opening 18 of the yoke 16. A first chamber 30, which in a preferred application is a gallery chamber, is defined between first and second valve seats 34, 36 which are longitudinally spaced apart within the hydraulic housing 20. In a preferred embodiment, the first valve seat 34 is closer to the first axial end 22 of the hydraulic housing 20 and the second valve seat 36 is closer to the second axial end 24 of the hydraulic housing. A second chamber 38, which in a preferred application is a tank chamber, is located on an opposite side of the first valve seat 34 from the first or gallery chamber 30, preferably between the first valve seat 34 and the first axial end 22 of the hydraulic housing 20. At least one at least partially radially extending first chamber communication opening 42 is located between the first chamber 30 and an outer surface of the hydraulic housing 20. This is shown most clearly in FIGS. 2A, 2B, and 3A. The first chamber communication opening 42 is a gallery chamber communication opening in a preferred application that is adapted to be in communication with a control gallery for pressurized hydraulic medium in an internal combustion engine, preferably for controlling a switchable valve train system. However, it can be used in other applications as well. At least one at least partially radially extending second chamber communication opening 44 is located between the second chamber 38 and an outer surface of the hydraulic housing 20. This is best seen in FIG. 3A. In a preferred application, this is adapted to be a tank communication opening that is in communication with a tank connection for draining pressurized fluid provided through the supply port 46 to a tank where it can be recirculated. The supply port 46 of the hydraulic housing 20 is adapted to receive pressurized hydraulic medium and is located at the second axial end 24 of the hydraulic housing 20. Preferably, a filter 48 is provided to keep dirt and other particles from entering the hydraulic housing 20 which could adversely affect the operation of the pressure compensated switching solenoid valve 10 and/or cause increased wear.

Referring again to FIGS. 1, 2A, and 2B, as well as FIG. 6A, a sealing tube 50 is connected to the hydraulic housing 20. A hollow longitudinally extending cup 52 extends inwardly in the longitudinal direction within the sealing tube 50, defining an annular armature guide receiving area 54 with a closed end 56. The sealing tube 50 and hollow longitudinally extending cup 52 can be constructed in various different ways. As shown in FIG. 6A, in a first embodiment of a sealing tube 50, the hollow longitudinally extending cup 52 is formed as a separate part and pressed into the sealing tube. Preferably, both the sealing tube 50 and the longitudinally extending cup 52 are deep drawn sheet metal parts. Alternatively, as shown in FIG. 6B where the sealing tube is in indicated as 50', here the hollow longitudinally extending cup 52' is integrally formed with the sealing tube 50' as a reverse deep-drawn part, preferably formed from sheet metal. This reduces part count and allows for a one piece construction that eliminates additional assembly steps. A further alternative embodiment is shown in FIG. 6C where the sealing tube 50" is formed as an open tubular structure and the hollow longitudinally extending cup 52" is formed as a separate deep-drawn part and is connected to the sealing tube 50" via welding as indicated at 51.

Referring again to FIGS. 1, 2A, and 2B, an armature 60 having a body 62 and a sleeve-shaped guide portion 64 extending therefrom is slideably located in the annular armature guide receiving area 54. The sleeve-shaped guide portion 64 has a generally annular upper surface 66 with a first surface area. At least one longitudinally extending groove, and preferably two longitudinally extending grooves 68A, 68B are provided along an outer surface of the body 62 and the sleeve-shaped guide portion 64. This is best shown in FIGS. 4A and 4B which provide detailed views of the armature 60.

As indicated in FIGS. 2A and 2B, a leakage path 96 is defined between the hollow longitudinally extending cup 52 and an inner surface 65 (shown in FIGS. 4A and 4B) of the sleeve-shaped guide portion 64 of the armature 60. This is the inner surface 65 as indicated in FIGS. 4A and 4B. Preferably, the armature 60 is guided via the sleeve-shaped guide portion 64 sliding on the hollow longitudinally extending cup 52. In order to achieve the desired guidance, the hollow longitudinally extending cup 52 is required to be aligned with the sealing tube 50 in a precise manner. For the embodiment of the press fit hollow longitudinally extending cup 52 shown in FIG. 6A, this may require a special tool to guide the cup 52 into place. To the extent that the sealing tube 50 is a deep-drawn part, the draft due to forming provides enough interference with the cup 52 outer diameter to maintain it in position once assembled. In the embodiment of the sealing tube 50' with the separate cup 52" that are welded together, a welding fixture would also provide the required alignment.

Referring again to FIGS. 1, 2A, and 2B, a sealing element 70 having a first end 72 and a second end 74 is located within the hydraulic housing 20. The first end 72 of the sealing element 70 engages an end of the armature 60. As shown in FIGS. 1, 2A, and 2B, preferably a seal 86 is located between the armature 60 and the sealing element 70. The sealing element 70 includes an upper shoulder 76 extending about the sealing element 70, intermediate sealing surface 78, and a poppet 80 located at the second end 74.

As shown in detail in FIGS. 5A and 5B, the sealing element 70 preferably includes a longitudinally extending hole 102 and at least one cross-hole 104 that is in communication with the longitudinally extending hole 102. The at least one cross-hole 104 is in communication with the tank chamber 38. Further, as shown in FIGS. 2A, 2B, and 4B, a longitudinally extending drain hole 98 extends through the armature body 62 that leads to the longitudinally extending hole 102 in the sealing element 70. As discussed in detail below, these provide a drainage path for pressurized hydraulic fluid used for compensating pressure acting on the switching solenoid valve 10.

Referring again to FIGS. 1, 2A, and 2B, a spring 82 is supported in the hydraulic housing 20 and contacts the upper shoulder 76 of the sealing element 70 in order to bias the sealing element 70 in a longitudinal direction such that the poppet 80 contacts the second valve seat 36. The sealing element 70 is moveable via the solenoid valve 11 and the spring 82 between a first position, as shown in FIG. 2A, in which the poppet 80 contacts the second valve seat 36 such that a fluid communication path through the first valve seat 34 between the tank chamber 38 and the gallery chamber 30 is available. In the preferred embodiment illustrated, the intermediate sealing surface 78 is on an intermediate sealing body 88 located on the sealing element 70. This intermediate sealing body 88 is slideable in the longitudinal direction of the sealing element 70 and is biased by a sealing body spring 90 in a direction of the first valve seat 34. The intermediate sealing body 88 is guided via a central opening 92 that slides on a stem 84 of the sealing element 70. Here, in the first position of the sealing element 70 shown in FIG. 2A, the sealing body spring 90 biases the intermediate sealing body 88 such that the intermediate sealing surface 70 contacts the first valve seat when a gallery pressure (transmitted to the gallery chamber 30 from the control gallery) drops below a predetermined value. Accordingly, the fluid communication path is available from the gallery chamber 30 to the tank chamber 38 only when the gallery chamber 30 pressure is above a certain amount sufficient to overcome the force of the sealing body spring 90. This is done in order to prevent leakage of hydraulic fluid or pressure medium from the control gallery which would reduce response times when the pressure compensated switching solenoid valve 10 is activated in connection with a valve train control system.

The sealing element 70 is moveable to a second position as shown in FIG. 2B upon activation of the solenoid 11. In this position, the intermediate sealing surface 78 contacts and seals against the first valve seat 34 and the poppet 80 is moved from the second valve seat 36 so that a fluid pathway from the supply port 46 through the second valve seat 36 to the gallery chamber 30 is open and pressurized hydraulic medium is adapted to be delivered to a switching gallery.

The hydraulic housing 20 further includes at least one pressure compensation fluid pathway, and in a preferred embodiment includes two pressure compensation fluid pathways 84A, 84B that extend from the supply port 46 to the at least one longitudinally extending groove 68A, 68B extending in an axial direction along the outer surface of the armature body 62 and the sleeve-shaped guide portion 64 of the armature 60. The at least one pressure compensation fluid pathway 84A, 84B is adapted to provide a path for pressurized hydraulic fluid to flow to the generally annular upper surface 66 of the armature 60 where it acts on the armature 60 to compensate for pressure fluctuations from a supply of pressurized hydraulic medium which acts on the poppet 80.

As shown in FIG. 2A, in a closed position of the valve 10, the hydraulic fluid pressure Fh1 acts on the poppet 80 as well as on an end 106 of the armature 60 that contacts the sealing element 70 that extends beyond an outer periphery of the sealing element 70 which forms a pressure contact surface 108 as indicated at Fh3. This pressure contact surface 108 has a smaller surface area than the generally annular upper surface 66 of the armature 60. Pressurized hydraulic medium from the supply port 46 can travel through the at least one pressure compensation fluid pathway 84A, 84B as well as the longitudinally extending groove 68A, 68B to reach the generally annular upper surface 66 of the armature 60 which provides an opposing pressure force indicated as Fh2 which, due to the greater surface area of the generally annular support surface 66 in comparison to the pressure contact surface 108 on the bottom of the armature results in a higher counterbalancing force (i.e., Fh2>Fh3).

Upon opening the valve as shown in FIG. 2B, the force of the solenoid, indicated as Fmag along with the pressure compensation force Fh2 are greater than and act against the spring force Fspr, the hydraulic force Fh1 on the poppet 80, and the hydraulic force Fh3 acting on the pressure contact surface 108 in order to move the poppet 80 from the second valve seat 36 and open the communication path such that pressurized fluid from the supply port 46 is provided to the control gallery via the gallery chamber 30.

Upon the solenoid 11 switching from an activated state to a deactivated state (i.e., Fmag=0), a force of the hydraulic fluid from the pressure supply acts on the intermediate sealing surface 48 indicated as Fh1$b$ in FIG. 2B along Fh3 and the spring force Fspr to return poppet 80 to a closed position against the second valve seat 36.

The sealing element 70 preferably includes the seal 86 in order to eliminate any leakage due to misalignment from the supply pressure that travels along the at least one pressure compensation fluid pathway 84A, 84B directly to tank without acting on the generally annular upper surface 66 of the armature 60.

The effects of the variable supply pressure force on the poppet 80 indicated as Fh1 in FIG. 2A is mitigated and therefore the operation response time is more uniform due to the pressure compensation force Fh2 acting on the generally annular upper surface 66.

The cup, 52, 52', 52" has a tight sliding fit with the armature 60 in order to provide guidance as well as minimize leakage to tank. However, a leakage path is provided as indicated at 96 in FIG. 2A in order to allow the pressurized fluid to return through the longitudinally extending drain hole 98 and the hole 102 in the sealing element 70 to the tank chamber 38.

Still with reference to FIGS. 2A and 2B, a method of reducing an effect of a variable supply pressure, indicated as Fh1 in FIG. 2A on a solenoid valve 10 is also provided. The method includes providing the pressure compensated switching solenoid valve 10 as discussed above. The solenoid valve 10 is normally closed as shown in FIG. 2A, with a path for pressurized hydraulic fluid to flow from the control gallery through the gallery chamber 30 to the tank chamber 38 where it can be discharged to tank. The solenoid 11 is activated generating a force Fmag that along with the hydraulic pressure compensation force Fh2 moves the sealing element 70 against the force Fspr of the spring 82 and the hydraulic pressure force Fh1 acting on the poppet 80 as well as hydraulic pressure force Fh3 action on the surface 106, from the first position to the second position, as shown in FIG. 2B, in which the intermediate sealing surface 78 contacts the first valve seat 34 and a fluid pathway from the supply port 45 through the second valve seat 36 to the gallery chamber 30 is open.

In the drawings, the pressurized hydraulic medium or fluid is indicated with an open arrow. Hydraulic pressure acting on the sealing element 70 indicated at Fh1$b$ as well as on the poppet 80 indicated as Fh1 is compensated by delivering pressurized hydraulic fluid from the supply port 46 through the at least one pressure compensation fluid pathway 84A, 84B that extends from the supply port 46 to the at least one longitudinally extending groove 68A, 68B of the armature body 62 and the sleeve-shaped guide portions 64 of the armature to the generally annular upper surface 66. Here, the compensating opposing force Fh2 generated by the pressurized medium acts in an opposite direction to the force Fh1 and Fh1$b$, as well as to the force Fh3 which acts on the end 106 of the armature 60 that contacts the sealing element 70. Upon deactivating the solenoid 11, the force Fspr of the spring 82 as well as the hydraulic fluid force Fh1$b$ acting on the intermediate sealing surface 78 move the sealing element 70 to the first position where the poppet 80 contacts the second valve seat 36. Here, the force of the solenoid Fmag allows for a fast reaction time due to the pressure compensation feature provided by the pressurized hydraulic fluid acting on the generally annular upper surface 66 of the armature 60 which has a greater surface area than the exposed end 106 of the armature that contacts the sealing element 70. This allows for more consistent and reliable switching times regardless of pressure fluctuations in the pressure supply connected to the supply port 46.

The flow of pressurized hydraulic fluid from the supply port 46 is maintained through the at least one pressure compensation fluid pathway 84A, 84B that extends from the supply port 46 to the at least one longitudinally extending groove 68A, 68B that extends along the outer surface of the armature body 62 and the sleeve-shaped guide portion 64 of the armature 60 to the generally annular upper surface 66 when the sealing element 70 is in the first state as indicated in FIG. 2A. Preferably, the at least one pressure compensation fluid pathway 84A, 84B is generally aligned with the longitudinally extending groove 68A, 68B of the armature 60. However, an annular recess can be provided at the first axial end 22 of the hydraulic housing 20 in order to allow a fluid communication pathway without unwanted throttling regardless of whether the at least one longitudinally extending groove 68A, 68B remains in alignment with the at least one pressure compensation fluid pathway 84A, 84B of the hydraulic housing 20. While the preferred embodiment of the invention has been described in detail, those skilled in the art will recognize that other changes could be made to the pressure compensated switching solenoid without departing from the scope of the present invention. Other types of coupling arrangements could be provided and the specific configuration could be varied without departing from the scope of the present invention. Accordingly, the scope of the invention should not be limited by the preferred embodiments discussed above and instead should be defined by the claims as noted below.

LIST OF ELEMENT NUMBERS 10 pressure compensated switching solenoid valve
11 solenoid
12 solenoid housing
13 cap
14 coil
15 bobbin
16 yoke
18 longitudinal opening
20 hydraulic housing
22 first axial end
24 second axial end
26 mounting tab
28 housing opening
30 first (gallery) chamber
34 first valve seat
36 second valve seat
38 second (tank) chamber
42 first chamber (gallery) communication opening
44 second chamber (tank) communication opening
46 supply port
48 filter
50, 50', 50" sealing tube
52, 52' hollow longitudinally extending cup
54 annular armature guide receiving area
56 closed end
60 armature
62 body
64 sleeve-shaped guide portion
66 annular upper surface
68A,B longitudinally extending grooves
70 sealing element
72 first end
74 second end
76 upper shoulder
78 intermediate sealing surface
80 poppet
82 spring
84A, B pressure compensation fluid pathways
86 seal
88 intermediate sealing body
90 sealing body spring
92 opening
94 stem
96 leakage path
98 drain hole
102 longitudinally extending hole
104 cross hole
106 armature end
108 pressure contact surface
110 overmold
112 terminals
114 o-ring
116 o-ring

What is claimed is:

1. A pressure compensated switching solenoid valve, comprising:
a solenoid with a coil located in a solenoid housing;
a yoke having a longitudinal opening extending in a stroke direction located within the coil;
a hydraulic housing having first and second axial ends, the hydraulic housing being connected at the first axial end thereof to the solenoid housing, a longitudinally extending housing opening extends between the first and second axial ends that is generally aligned with the longitudinal opening of the yoke, a first chamber defined between first and second valve seats longitudinally spaced apart within the hydraulic housing and a second chamber located on an opposite side of the first valve seat from the first chamber, at least one at least partially radially extending first chamber communication opening located between the first chamber and an outer surface of the hydraulic housing, at least one at least partially radially extending second chamber communication opening located between the second chamber and an outer surface of the hydraulic housing, and a supply port adapted to receive pressurized medium located at the axial second end;
a sealing tube connected to the first axial end of the hydraulic housing, and a hollow longitudinally extending cup with a closed end extending inwardly in a longitudinal direction within the sealing tube, defining an annular armature guide receiving area with a closed end;
an armature having a body and a sleeve-shaped guide portion extending therefrom that is slidably located in the annular armature guide receiving area, the sleeve-shaped guide portion having a generally annular upper surface with a first surface area, and at least one longitudinally extending groove extending along an outer surface of the body and the sleeve-shaped guide portion;
a sealing element having a first end and a second end, the sealing element being located in the hydraulic housing, the first end engaging an end of the armature, and the sealing element including an upper shoulder extending about the sealing element, an intermediate sealing surface, and a poppet located at the second end;

a spring that is supported in the hydraulic housing and contacts the upper shoulder in order to bias the sealing element in a longitudinal direction such that the poppet contacts the second valve seat;

the hydraulic housing further comprising at least one pressure compensation fluid pathway that extends from the supply port to the at least one longitudinally extending groove extending along the outer surface of the armature body and the sleeve-shaped guide portion of the armature adapted to provide a path for pressurized hydraulic fluid to flow to the generally annular upper surface of the armature to compensate for pressure fluctuations from a pressure supply that act on the poppet.

2. The pressure compensated switching solenoid valve of claim 1, wherein the sealing element is movable via the solenoid and the spring between a first position, in which the poppet contacts the second valve seat such that a fluid communication path through the first valve seat between the second chamber and the first chamber is available, and a second position in which the intermediate sealing surface contacts and seals against the first valve seat and the poppet is moved from the second valve seat so that a fluid pathway from the supply port through the second valve seat to the first chamber is open and pressurized hydraulic medium is adapted to be delivered to a connection to the first chamber.

3. The pressure compensated switching solenoid valve of claim 1, further comprising a seal between the armature and the sealing element.

4. The pressure compensated switching solenoid valve of claim 1, wherein, upon the solenoid switching from an activated state to a deactivated state of the solenoid, a force of hydraulic fluid from the pressure supply acts on the intermediate sealing surface and the spring acts on the sealing element to return the poppet to a closed position against the second valve seat.

5. The pressure compensated switching solenoid valve of claim 1, wherein the intermediate sealing surface is located on an intermediate sealing body located on the sealing element that is slideable in the longitudinal direction of the sealing element and is biased by a sealing body spring in a direction of the first valve seat.

6. The pressure compensated switching solenoid valve of claim 5, wherein in the first position of the sealing element, the sealing body spring reseats the intermediate sealing body such that the intermediate sealing surface contacts the first valve seat when a pressure in communication with the first chamber drops below a predetermined value.

7. The pressure compensated switching solenoid valve of claim 1, further comprising a leakage path between the hollow longitudinally extending cup and an inner surface of the sleeve-shaped guide portion of the armature.

8. The pressure compensated switching solenoid valve of claim 7, further comprising a longitudinally extending drain hole through the armature body that leads to a longitudinally extending hole in the sealing element, and at least one cross hole in the sealing element in communication with the longitudinally extending hole in the sealing element, the at least one cross hole is in communication with the second chamber.

9. The pressure compensated switching solenoid valve of claim 8, wherein an end of the armature that contacts the sealing element extends radially beyond an outer periphery of the sealing element forming a pressure contact surface that has a smaller surface area than the generally annular upper surface of the armature.

10. The pressure compensated switching solenoid valve of claim 1, wherein the armature is guided via the sleeve-shaped guide portion sliding on the hollow longitudinally extending cup.

11. The pressure compensated switching solenoid valve of claim 1, wherein the hollow longitudinally extending cup is formed as a separate part and press-fit in the sealing tube.

12. The pressure compensated switching solenoid valve of claim 1, wherein the hollow longitudinally extending cup is integrally formed with the sealing tube as a reverse deep-drawn part.

13. The pressure compensated switching solenoid valve of claim 1, wherein the hollow longitudinally extending cup is formed as a separate part and welded to the sealing tube.

14. The pressure compensated switching solenoid valve of claim 1, wherein the valve controls a switchable valve train system and the first chamber is a gallery chamber and the second chamber is a tank chamber.

* * * * *